3,215,719
SILICATE ESTERS OF ESSENTIAL ALCOHOLS
Thomas C. Allen, High Point, N.C., and Harold J. Watson, Danville, Va., assignors to Dan River Mills, Incorporated, Danville, Va., a corporation of Virginia
No Drawing. Filed Sept. 1, 1961, Ser. No. 135,448
5 Claims. (Cl. 260—448.8)

This invention relates to novel compositions of matter, novel textile treatments and novel treated textiles. More particularly, the invention is directed to novel textile treating compositions which when applied to textiles provide a persistent and renewable essence thereto, thus resulting in a novel textile product.

Odoriferous materials, such as perfumes, toilet water, scents, deodorants, and the like, have come into widespread use for masking disagreeable odors and in general for imparting a pleasant, agreeable fragrance to textile materials in general, and wearing apparel in particular. The effects of such odoriferous materials are generally short-lived without reapplication, in many cases several times daily. Washing or cleaning, of course, eliminates the odoriferous effects. Furthermore, in some cases, sensitive fabrics are damaged or stained by these odoriferous materials, thus limiting their usefulness to certain kinds of fabrics.

The present invention has as its principal object the provision of novel compositions of matter which can be applied to textiles to impart thereto a lasting fragrance.

Another object is the provision of treated textiles having a lasting fragrance and textile treating methods for producing said treated textiles.

A further object is the provision of novel compositions of matter which are eminently useful for treating textiles to impart a lasting fragrance which can be renewed from time to time and strengthened by the application of moisture.

A still further object is the provision of novel compositions of matter which when applied to textiles will provide the above-mentioned advantages without altering the natural or customary appearance of the textiles to which they are applied.

Further objects and advantages of the invention will become apparent from the following detailed description.

In a broad aspect the novel compositions of this invention comprise silicate esters of the essential alcohols, including the essential isoprenoid alcohols, the essential aryl-substituted aliphatic alcohols and the essential aliphatic-substituted phenols. A silicate ester as described above is best fitted for treating textiles to impart a long-lasting fragrance which is strongly renewable upon moistening or wetting when the molar ratio of essential alcohol to silicon in the silicate ester is about 1.0 to about 2.5 and the molar ratio of silicon-bonded lower alkoxy groups to silicon is about 1.0 to 3.0. Silicate esters containing less than 1.0 mole of essential alcohol per mole of silicon or less than 1.0 lower alkoxy group per silicon atom are useful for other purposes, e.g., in sachets and the like although such silicate esters can be used in treating textiles, if a lower degree of original and/or renewable fragrance imparted to the textile is desired.

The silicate esters of this invention are formed in effect by the replacement of one or more alkoxy group or alcoholyzable group, e.g., silicon-bonded halogen, hydrogen (with chloroplatinic acid, sodium, alkoxide, lithium alkoxide, hydrogen chloride or zinc chloride catalysts), or amino groups, of a silane with the desired number per silicon atom of organic oxy groups of an essential alcohol and, if desired, any remaining silicon-bonded alcoholyzable groups can be replaced with the desired number of lower alkoxy groups of lower alkanols. In this connection it will be understood that the well-known siloxanes containing alkoxy groups or alcoholyzable groups will react in basically the same manner and can be employed in place of the alcoholyzable silanes. Similarly, the silicate esters described and claimed herein include the siloxanes as well as the silanes of essential alcohols and can be formed by the replacement of one or more alkoxy or alcoholyzable group of a siloxane with the organic oxy group of the essential alcohol as well as by the partial hydrolysis and condensation of said silanes having a silicon-bonded organic oxy group of the essential alcohol.

In substance, the novel silicate esters contain at least one essential organic oxy group, derived from an essential organic hydroxy compound by displacement of the hydroxy group thereof, bonded to silicon of a silane or siloxane by a silicon to oxygen to carbon bond wherein the carbon is a part of the essential organic oxy group and the silicon is a part of the silane or siloxane. It has been found for the most part that the essential organic oxy groups bonded to silicon as above-described hydrolyze at a very low rate such that amounts of the essential organic hydroxy compound, from which the novel silicate ester is made, is slowly and continuously formed over long periods of time. The rate of hydrolysis of a particular novel silicate ester (for example, after application to a textile) will be dependent upon the amount of moisture in contact therewith and washing or laundering will release comparatively large amounts of essential organic hydroxy compound to renew the original fragrance of the treated textile whereas smaller amounts of moisture such as are normally in the atmosphere may release comparatively smaller amounts to replenish at least a portion of previously released essential organic hydroxy compound lost by evaporation.

The novel silicate esters of this invention are advantageously prepared by the reaction of an essential organic hydroxy compound and an alkoxy silane, both of which are well known materials. Illustratively, the essential organic hydroxy compound contains an aliphatic or aromatic hydroxyl group and is characterized by a fragrance and includes the essential isoprenoid alcohols, e.g., the cyclic and acyclic essential terpene alcohols including geraniol, citronellol, farnesol, terpineol, menthol, and the like or the fragrant component and/or derivative alcohols thereof, and the like; the essential aryl-substituted aliphatic alcohols including cinnamyl alcohol, phenylethyl alcohol, and the like; and the essential aliphatic-substituted phenols, including thymol, vanillin, salicylaldehyde, methyl salicylate, eugenol and the like. The alkoxy silanes include the organic orthosilicates such as tetraethyl orthosilicate, which because of ready availability is preferred, as well as the many types of the organic- or hydrocarbon-substituted, alkoxy silanes, i.e., alkoxy silanes having various other organic groups bonded to silicon thereof. Other methods of making the novel silicate esters of this invention can be employed. For example, other alcoholyzable silanes or siloxanes, such as the silicon-bonded halogen-containing silanes or siloxanes, or the well-known hydrogen silanes or siloxanes, can be used in place of the alkoxy silane or siloxane reactant. Additionally, the halide of the essential organic hydroxy compound (e.g., as prepared by treating said organic oxy compound with phosphorus pentachloride) can be reacted with a hydrogen, or alkoxy, silane or siloxane.

In order to control hydrolysis, the reaction is carried out under substantially anhydrous conditions and advantageously can be conducted by refluxing the hydroxy compound (or its halide) and the silane at ordinary pressures while withdrawing the alkanol corresponding to the alkoxy group on the silane (or the hydrogen halide or alkyl halide) formed as an adjunct to the replacement of alkoxy groups (or other hydrolyzable groups) on the silane with the organic oxy groups of the hydroxy compound. The adjunct (i.e., alkanol, etc.) thus formed is a convenient measure of extent of the reaction, indicating the number of alkoxy groups (or other alcoholyzable groups) on the silane which have been replaced by organic oxy groups of the essential organic hydroxy starting material (or its halide). When the desired number of organic oxy groups have been bonded to the silane, the reaction is stopped and any suitable recovery means such as stripping, distillation, crystallization, extraction, and the like can be employed, to the extent they are applicable, to recover and purify the novel silicate ester. An advantageous procedure is to employ respective amounts of essential organic hydroxy compound (or its halide) and alcoholyzable silane which are desired to be combined in the final reaction product. Thus refluxing during the reaction can be employed to remove the alkanol (or hydrogen halide, etc.) formed as adjunct leaving a substantially pure silicate ester as residue and no further recovery or purification steps would normally be necessary.

Silicate esters of this invention in the form of silanes include those represented by the formula:

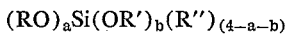

wherein RO is the organic oxy group of an essential organic hydroxy compound having the formula ROH wherein R is an organic group; R' is an alkyl group, preferably lower alkyl having 1 to 6 carbon atoms or can be phenyl; and R" is a monovalent organic group which is a part of the starting silane, e.g., such as any of the well-known hydrocarbon-substituted or other organic-substituted silanes; $a$ is an integer from 1 to 4; $b$ is an integer from 0 to 3; and $a+b$ is not more than 4. For purposes of treating textiles as hereinafter described, it is preferred to employ a silicate ester of the above formula wherein R' is an alkyl group having 1 to 6 carbon atoms and $b$ is an integer of at least one.

Silicate esters of this invention in the form of siloxanes include those containing groups represented by the formula:

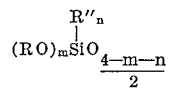

wherein R and R" are as defined above, $m$ is an integer of 1 to 3, $n$ is an integer of 0 to 2, and $m+n$ is an integer of 1 to 3, as the only groups of the siloxane or in combination with other siloxane units, e.g., dimethylsiloxy, methylsiloxy, trimethylsiloxy, phenyl-siloxy, phenylmethylsiloxy, groups, and the like.

Any suitable method for applying the novel silicate ester to textiles, e.g., cellulosic textiles including cotton, mixtures of cotton with other textiles and modified cotton, can be employed. A particularly useful method is to pad the textile through an aqueous dispersion of the silicate ester using a nonionic emulsifier (although any of the many other emulsifiers, ionic or nonionic, or dispersing agents suitable for applying finishes, sizes, and modifiers to textiles can be employed). In addition to applying the silicate ester as aqueous dispersions, they can be applied as solutions in suitable solvents including water when such solubility is characteristic. In this connection it will be understood that the specific organic oxy groups on the silicon of the novel silicate ester are hydrolyzable at different rates and it will be a matter of choice by the operator as to whether an aqueous application system or a non-aqueous application system will be used. Thus, products containing the more easily hydrolyzable organic oxy groups when applied from a non-aqueous medium can be expected to provide longer lasting effects than when applied from an aqueous medium. For special purposes the novel silicate ester, if normally a liquid, can be applied in undiluted form, e.g., where a particularly heavy surface deposition is desired. In general, any technique for applying finishes, sizes, or other fiber modifiers can be employed if commensurate with the particular properties of a specific novel silicate ester.

After impregnation of the textile, as by padding operation, the impregnated textile is dried. In most cases air-drying at ambient temperatures is adequate although for rapid drying heat and/or forced air can be employed. The usual after-treatment, such as washing, schreinering, Sanforizing, and the like, can be applied, if desired, to provide special effects.

The resulting treated textile retains the natural appearance of the textile prior to treatment but is delightfully characterized by the fragrance of the essential organic hydroxy compound employed in making the novel silicate ester with which the textile is treated. Surprisingly, this fragrance persists for long periods and withstands launderings which in fact renew and strengthen the fragrance. Under very dry conditions the fragrance becomes faint whereas under moister conditions the fragrance becomes stronger.

The following examples are presented.

*Example 1*

Two moles of beta-phenylethyl alcohol and one mole of tetraethyl silicate, with 0.5 gm. of silicon tetrachloride as catalyst, were placed in a distilling flask equipped with a fractionating column and a condenser. This mixture was then refluxed until two moles of ethyl alcohol were collected. The reaction temperature during this time did not exceed 150° C. and the time of refluxing was approximately two hours. The product in the flask was a light yellow liquid having 6.66% silicon and comprised predominantly bis (beta-phenylethoxy) diethoxy silane.

The product was easily emulsified in water with Triton X–100 (an alkaryl monoether of polyoxyethylene glycol) to form an emulsion containing 1.6 weight percent of the product. The emulsion was then applied to cotton cloth by padding to a 60% wet pickup. The cloth was then air-dried, and had a fragrance of roses. Immediately after washing and drying the treated cloth, the fragrance of roses became stronger. This fragrance gradually decreased with time, becoming very faint when the fabric was extremely dry and increasing in the presence of a small amount of moisture. The rose fragrance was still present and strongly renewable by contact with water, even after twenty home launderings.

*Example 2*

Two moles of terpineol and one mole of tetraethyl silicate, with 0.5 g. of silicon tetrachloride as catalyst, were mixed and refluxed as described in Example 1. The reaction was slow in starting so an extra 0.5 gm. of silicon tetrachloride was added. Two moles of ethyl alcohol were collected at 77–79° C. in about seven hours. The product in the flask was a golden brown liquid having 8.71% silicon and comprised predominantly bis (terpineoxyl) diethoxy silane, $(C_{10}H_{17}O)_2(C_2H_5O)_2Si$.

The product was easily emulsified in water with Triton X–100 to form an emulsion containing 10 weight percent of the product. The emulsion was applied to cotton cloth in the same manner and to 60% wet pickup. After air-drying the treated cloth had the fragrance of pine oil which was stronger when the fabric was in the presence of moisture and fainter as the fabric became drier. The pine oil fragrance persisted and was strongly renewable by washing even after five home launderings.

*Example 3*

Two moles of d,l-menthol and one mole of tetraethyl silicate, with 0.33 gm. of silicon tetrachloride as catalyst, were mixed and refluxed according to the procedure in Example 1. One mole of ethyl alcohol distilled off very fast with the reaction temperature not exceeding 95° C. The second mole of ethanol did not begin distilling until the reaction temperature reached 190° C. The temperature then rapidly rose to 250° C. whereupon the evolution of the second mole of ethanol was completed. The resulting product was a golden brown liquid having 5.11% silicon and comprised predominantly bis (menthoxy) diethoxy silane $(C_{10}H_{19}O)_2(C_2H_5O)_2Si$.

*Example 4*

Two moles of eugenol and one mole of tetraethyl silicate, with 0.5 gm. silicon tetrachloride as catalyst, were mixed and refluxed according to the procedure of Example 1. Over a period of time approximately two moles of ethyl alcohol boiling at 78 to 80° C. were distilled off and collected. The reaction temperature during refluxing went as high as 310° C. The product remaining in the flask was a dark reddish-brown liquid having 5.16% silicon and comprised predominantly bis (eugenoxy) diethoxy silane, $(C_3H_5)(CH_3O)C_6H_3O_2(C_2H_5O)_2Si$.

The product was easily emulsified in water with Triton X-100 to form an emulsion containing 1.6 weight percent of the product. The emulsion was padded onto cotton cloth to a 60 percent wet pickup and the cloth was air-dried. The treated cloth had a fragrance of cloves which became stronger in the presence of moisture and persisted even after 20 launderings.

*Example 5*

One mole of geraniol and one-half mole of tetraethyl silicate, with five grams of tetraisopropyl titanate as catalyst, were mixed and refluxed following the procedure of Example 1. One mole of ethyl alcohol was recovered as distillate at a temperature of 78° C. The reaction temperature was in the range from 99° C. to 280° C. The time of reaction was 22 minutes. The product was a clear orange liquid having a 6.51% silicon and comprised predominantly bis (geranioxy) diethoxy silane, $$(C_{10}H_{17}O)_2(C_2H_5O)_2Si$$

The product was easily emulsified in water with Triton X-100 to form an emulsion containing 1.6 weight percent of the product. The emulsion was applied to a cotton cloth to a 60 percent wet pickup following the procedure of Example 1 and then air-dried. The fragrance of geraniol was strong in the presence of moisture and fainter under dry conditions. The fragrance persisted and was strongly renewable by contact with water even after 20 launderings.

*Example 6*

One mole of cinnamyl alcohol and one-half mole of tetraethyl silicate, with five grams of tetraisopropyl titanate as catalyst, were mixed and refluxed according to the procedure of Example 1. One mole of ethyl alcohol was recovered at 77-79° C. in 27 minutes. The reaction temperature was in the range from 98 to 265° C. The product was a dark red liquid having 7.05% silicon and comprised predominantly bis (cinnamyloxy)diethoxy silane $(C_9H_9O)_2(C_2H_5O)_2Si$.

The product was easily emulsified in water with Triton X-100 by the method described in Example 1 to form an emulsion containing 1.6 weight percent of the product. The emulsion was padded onto cotton cloth to a 60 percent wet pickup and air-dried. The treated cloth had a fragrance of cinnamyl-alcohol which became more pronounced under moist conditions and persisted even after 20 launderings.

*Example 7*

Three moles of isopropyl alcohol were slowly added to one mole of methyltrichlorosilane to give methyltriisopropoxysilane. The excess isopropyl alcohol was removed from this product, but no further distillation was performed. To 45.5 grams (0.2 mole) of methyltriisopropoxysilane, thus prepared, 25.2 grams (0.2 mole) of phenylethyl alcohol and 0.5 gram of tetraisopropyl titanate as catalyst were added and the mixture was distilled until 11 ml. of isopropyl alcohol (15 theoretical) were recovered. The time of this reaction was exactly one hour. The product was mainly methyldiisopropoxyphenylethoxysilane.

The product was easily emulsified in water with a nonionic emulsifier to form an emulsion containing 3.3 weight percent of the product. The emulsion was then applied to cotton cloth by padding to a 60% wet pickup. The cloth was then air-dried and had the same fragrance of roses as Example 1. This fragrance was still present after five home launderings.

*Example 8*

The products of Examples 1, 4, 5, and 6 were applied to cloth with a crease-proofing resin in the following manner.

|  | Percent |
|---|---|
| Mixture of about 50 mole percent of dimethylol ethyl triazone and about 50 mole percent of dimethylol urea | 12 |
| Catalyst 50 (a 50% solution of $Zn(NO_3)_2 \cdot 6H_2O$) | 2.5 |
| Silicate ester | 1.6 |
| Triton X-100 (nonionic emulsifier) | 0.3 |

Cured at 165° C. for 70 seconds.

This procedure gives one percent of the silicate ester deposited on the cloth. Before washing there was a mixture of formaldehyde and perfume odors on all samples. After five home launderings there was a general perfume odor. After twenty home launderings there was still a faint perfume odor on all samples.

What is claimed is:
1. Novel silicate ester having the general formula:

$$(RO)_aSi(OR')_b(R'')_{(4-a-b)}$$

wherein RO— is an organic oxy group selected from the class consisting of eugenoxy, beta-phenylethoxy and cinnamyloxy, R' is a monovalent group from the class consisting of alkyl and phenyl; R'' is a methyl group; $a$ is an integer from 1 to 2; $b$ is an integer from 2 to 3; and $a+b$ is not more than 4.
2. (Phenylethoxy) (diisopropoxy) methyl silane.
3. Bis (beta-phenylethoxy)diethoxy silane.
4. Bis (eugenoxy) diethoxy silane.
5. Bis (cinnamyloxy) diethoxy silane.

References Cited by the Examiner

UNITED STATES PATENTS

| 2,550,923 | 5/51 | Hackford et al. | 106—287 |
| 2,566,365 | 9/51 | Pedlow et al. | 260—448.8 |
| 2,634,216 | 4/53 | Moulton | 106—287 |
| 2,643,263 | 6/53 | Morgan | 260—448.8 |
| 2,643,964 | 6/53 | Smith-Johannsen | 260—448.8 |
| 2,924,575 | 2/60 | Kaufman | 260—448.8 |
| 3,024,262 | 3/62 | Sommer et al. | 260—448.8 |

FOREIGN PATENTS 662,732  7/38  Germany.

OTHER REFERENCES

Gerrard et al.: "Jour. Chem. Soc.," London, 1956, p. 1536-9.

Larsson: "Berichte der Deutschen Chemischen Gesellschaft," vol. 86, 1953, pp. 1382-3.

TOBIAS E. LEVOW, *Primary Examiner.*

ALPHONSO D. SULLIVAN, SAMUEL H. BLECH,
*Examiners.*